Feb. 19, 1963       JUNICHI SASAKI ET AL       3,077,672
                METHOD OF STARTING A GYROCOMPASS
Filed June 27, 1960                          6 Sheets-Sheet 1

United States Patent Office 3,077,672
Patented Feb. 19, 1963

3,077,672
METHOD OF STARTING A GYROCOMPASS
Junichi Sasaki, 57 4-chome, Denenchofu Ota-ku, Tokyo, Japan; Takamune Soda, 302 Hisagi, Zushi-shi, Japan; Yoshio Nakamatsu, 1063 3-chome Tamagawa-Oku-sawa-machi, Setagaya-ku, Tokyo, Japan; Minoru Kobayashi, 239 Mukaihara-machi, Meguro-ku, Tokyo, Japan; and Osamu Tochikura, 6162 Honson, Chigasaki-shi, Kanagawa-ken, Japan
Filed June 27, 1960, Ser. No. 39,176
9 Claims. (Cl. 33—226)

This invention relates to a gyrocompass damping system, particularly to such a system whereby the time from starting a gyrocompass up to settling of reading on the meridian, or the settling time, can considerably be decreased.

For the purpose of damping oscillations about the meridian, to which the north seeking element of a gyrocompass is subjected, there is generally provided either a so-called "Anschütz" type damping device, in which a viscous liquid is displaced within a suitable vessel to damp the oscillation, or a so-called "Sperry" type damping device, in which a component of the movement of the north seeking element produces a displacement of a mass of mercury within a particularly built vessel which in turn offsets the cause of the said oscillation. Whatever form the gyrocompass and its damping device may take, however, all previously known methods of initiating operation require a period from starting up to settling of reading which may be as long as several hours.

One conventional starting method, for example, is that wherein the gyro-rotor which forms the north seeking element of the gyrocompass, is set into rotation by means of an induction type electrical motor. These motors and the gyro-rotors they drive turn at a speed directly proportional to the frequency of an applied alternating current. This frequency is applied at the beginning of the starting period thus immediately causing the rotor to turn at normal operating speed from the first instant of start.

One feature of this invention resides in that at the beginning of the starting period of the gyrocompass, the gyro-rotor is made to rotate at a speed lower than normal. Then its speed is increased gradually to attain normal operation.

Another feature is that at the beginning of the starting period the gyro-rotor is set in rotation at an initial speed corresponding to first applied A.C. frequency which is lower than the normal frequency. The induction motor driving the rotor is then transferred to a source of normal operating frequency at a prescribed instant. This subsequent change produces a further transient oscillation that will offset the initial oscillation caused by the application of the low frequency power.

Further features will be well clarified in the detailed explanation given in the following by aid of several illustrative examples embodying the principle of this invention.

Figure 1:
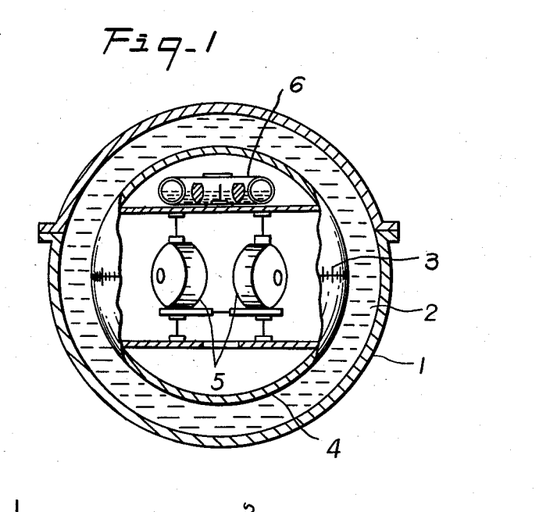
FIG. 1 is a cross-sectional view of an Anschütz-type dual-rotor gyrocompass with a viscous type oscillation damping device.

In FIG. 1 is shown a gyrocompass equipped with a damping device utilizing the displacement of a viscous liquid, wherein floated in the liquid 2, which is contained in an outer sphere 1, is a north seeking inner sphere or sensitive element 4, which is provided with azimuth scale 3 on the external surface thereof within which are disposed dual gyro-rotors 5 having horizontal axes. A damping mechanism 6 is mounted directly above the gyro-rotors 5 within the north seeking inner sphere 2. The damping mechanism comprises an annular vessel containing a viscous liquid therein.

Utilizing an illustrative example of a gyrocompass having an oscillation damping device as shown in FIG. 1, the behavior thereof from its starting to its settling at a north pointing position may, as priorly known, be expressed by the following Equation 1:

$$H\frac{d^3\alpha}{dt^3}+HF\frac{d^2\alpha}{dt^2}+B\omega \cos \lambda \frac{d\alpha}{dt}+(B-C)F\omega \cos \lambda \cdot \alpha = 0 \quad (1)$$

wherein:

H: product of rotating speed and moment of inertia of the gyro-rotor,
F: fluidity constant of the viscous oil,
B: restoring torque constant of the inner sphere with respect to the horizontal position,
$\omega$: angular velocity of the earth rotation,
$\lambda$: the latitude,
C: anti-restoring torque constant due to the gravitational mass of the viscous oil,
$\alpha$: deviation angle of the inner sphere,
$t$: time elapsed from the instant of start.

As generally known, this equation can be resolved from the following three basic equations;

$$H\left(\frac{d\alpha}{dt}+\omega \sin \lambda\right)=B\beta+C\gamma \quad (2)$$

$$H\left(\frac{d\beta}{dt}+\omega \cos \lambda \cdot \alpha\right)=0 \quad (3)$$

$$\frac{d\gamma}{dt}+F(\beta+\gamma)=0 \quad (4)$$

wherein:

$\beta$: inclination or "dip" angle of the inner sphere with respect to the horizon, taken about a generally east-west axis,
$\gamma$: angular difference between the oil level at the north seeking part and the south seeking part of the cylindrical annular vessel 6.

Equation 2 shows that the precession speed of the gyro-rotors due to the restoring torque $B\beta$, when the inclination angle of the inner sphere is $\beta$, and the torque produced by the damping oil, $C\gamma$, is $$\frac{d\alpha}{dt}+\omega \sin \lambda$$

Equation 3 shows that the north seeking part appears to have an inclination speed $$\frac{d\beta}{dt}$$

by virtue of the component of the earth rotation when the deviation angle of the north seeking axis of the gyrocompass is $\alpha$; and Equation 4 shows that, when the inclination angle of the inner sphere is $\beta$ and the angular difference between the oil levels within the inner oil vessel is $\gamma$, the speed of oil flow in one direction, namely, the derivative of the oil level $$\frac{d\gamma}{dt}$$

is proportional to the resultant difference of oil levels.

Given the north point deviation, $\alpha_0$, with respect to the meridian, at the instant of starting the north seeking motion of the north seeking element 4, and the gyro-rotors having been set in rotation, the following Equation 5 may be obtained from the Equation 1:

$$H\frac{d^3\alpha}{dt^3}+HF\frac{d^2\alpha}{dt^2}+B\omega \cos \lambda \frac{d\alpha}{dt} = -(B-C)F\omega \cos \lambda \cdot \alpha_0$$

In the early stage of this start, the rate of change of acceleration of the deviation angle $$\frac{d_3\alpha}{dt^3}$$

has a substantial finite value, but the acceleration alone of the angle $$\frac{d^2\alpha}{dt^2}$$

and its velocity $$\frac{d\alpha}{dt}$$

must gradually increase from zero as the time elapses. Thus the acceleration $$\frac{d^2\alpha}{dt^2}$$

and velocity, $$\frac{d\alpha}{dt}$$

of the deviation angle $\alpha$, may initially be neglected as compared to its rate of change of acceleration, $$\frac{d^3\alpha}{dt^3}$$

Accordingly, the above Equation 5 may be expressed as follows:

$$H\frac{d^3\alpha}{dt^3} = -(B-C)F\omega \cos \lambda \cdot \alpha_0 \qquad (6)$$

After a certain time, the velocity of the deviation angle $$\frac{d\alpha}{dt}$$

alone can be neglected as compared to its rate of change of acceleration $$\frac{d^3\alpha}{dt^3}$$

and its acceleration $$\frac{d^2\alpha}{dt^2}$$

so that the Equation 5 may be expressed in the following manner:

$$H\frac{d^3\alpha}{dt^3}+HF\frac{d^2\alpha}{dt^2} = -(B-C)F\omega \cos \lambda \cdot \alpha_0 \qquad (7)$$

As the terms at the left side of the Equations 6 and 7 are the products of H and $$\frac{d^3\alpha}{dt^3}$$

or of H and $$F\frac{d^2\alpha}{dt^2}$$

and since the right sides of these equations are lacking in H and $\alpha$ terms it may be seen that by decreasing H, the $\alpha$ terms, namely $$\frac{d^3\alpha}{dt^3} \text{ and } \frac{d^2\alpha}{dt^2}$$

will become greater so that the damping of the deviation angle, $\alpha$, is hastened. That is to say, if H is decreased, as by lowering the speed of rotation of the gyro-rotors, the time necessary to attain settling of the north seeking sphere 4 on the meridian is made shorter.

The manner in which this principle is incorporated into the present invention will now be described.

For the sake of simplicity in explanation, a case will first be considered in which the viscous damping oil has no flowing motion in the annular vessel 6, i.e., $F=0$. For this case an undamped oscillation will take place. That is, the locus of a point on the north seeking sphere 4 will describe an ellipse centered in azimuth by the north meridians ($\alpha=0$) and in inclination by the dip angle $$\beta = \frac{H\omega \sin \lambda}{B}$$

From the Equations 2 and 3 the relation between the azimuth angle, $\alpha$, and the dip angle, $\beta$, is found to produce the following ratio:

$$\frac{\alpha}{\beta - \frac{H\omega \sin \lambda}{B}} = \sqrt{\frac{B}{H\omega \sin \lambda}}$$

Now, for the purpose of having a simple expression of equations in general, the origin of the $\beta$ axis may hereinafter be shifted to $$\beta = \frac{H\omega \sin \lambda}{B}$$

Then if $\beta_1$ shows the magnitude according to the new co-ordinate, we shall have, $$\beta_1 = \beta - \frac{H\omega \sin \lambda}{B}$$

thus the ratio of the major axis and the minor axis of the ellipse will be, $$\frac{\alpha}{\beta_1} = \sqrt{\frac{B}{H\omega \cos \lambda}}$$

Replacing each constant with respective numerical value which is very common in present gyrocompass structures, the ratio, $\alpha:\beta_1$, comes to be about 20:1.

In regard to this locus, H is smaller when the rotating speed of the gyro-rotor is lower so that the dip angle, $\beta_1$, becomes even smaller with respect to the azimuth angle, $\alpha$.

Figure 2:
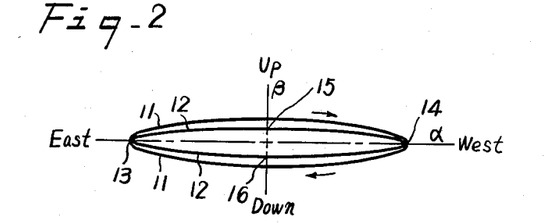
FIGS. 2, 3 and 4 are the graphs showing the north seeking motion of the gyrocompass, which may aid in understanding the principle of this invention.
Figure 3:
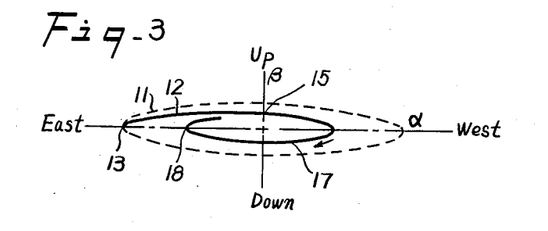
Figure 4:
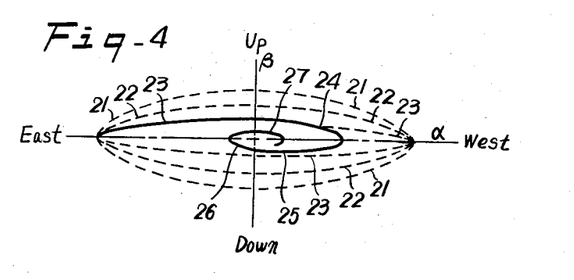

FIGS. 2, 3 and 4 show loci as seen on the north seeking motion from the north side, taking $\alpha$ as abscissa and $\beta_1$ as ordinate, and the up, down; east- and west-sides such as described in the graph, the scale of the ordinate being enlarged for the convenience of explanation.

In FIGS. 2 and 3, the line 11 indicates the locus of a point on the north seeking sphere 4 when the gyro-rotors 5 are operating at normal speed. Similarly, the line 12 indicates such a locus where the gyro-rotor speed is one-fourth of normal, the same initial condition of azimuth angle being assumed. (Theoretically speaking, the center of the elliptical locus also changes since, as seen above, $\beta$, varies with changes in H, which in turn varies with rotor speed. However the actual amount of this change is negligably small with respect to the damping effects to be described and need not be further considered.)

In the north seeking motion of the gyrocompass, the azimuth angle $\alpha$ and the dip angle $\beta_1$, are mutually interrelated so that either may be decreased to effect a shortening of the settling time when the decrease is brought about at a proper instant. The period of undamped oscillation is expressed by 2

$$\pi \sqrt{\frac{H}{H\omega \cos \lambda}}$$

therefore, the more H is reduced (as by decreasing the rotational velocity of the gyro-rotor), the shorter becomes the period of oscillation and the smaller becomes the dip angle $\beta_1$. Considering now the gyro-rotor to be started when the center of the north seeking sphere has an easterly deviation such as indicated by point 13 in FIG. 3, it will be seen that if the rotational velocity is initially made low, the locus of the north seeking element 4 will follow the inner curve 12; while if it is initially made high (as at normal operating speed), the outer curve 11 would be followed. In any event, the ratio between the maximum deviation and maximum inclination $\alpha:\beta_1$ is always given by $$\sqrt{\frac{B}{H\omega \cos \lambda}}$$

It will be observed that the timing of the instant at which the rotor speed changes are made is especially important in obtaining optimum results. Considering, for example, the locus of the north seeking element to be at point 13, in FIG. 2 with the rotor being switched at this point from low to high speed. When this happens, the rotor merely follows the outer curve 11 rather than the inner curve 12; and, if anything, a disadvantage results, for the maximum dip angle $\beta_1$ will be increased. On the other hand, if the initial low rotor speed is maintained until the locus of the north seeking element travels along the inner curve 12 to a point somewhere in the vicinity of the point 15; and then the rotor speed is increased, the locus will take a sharp dip and follow a path shown by the solid line 17 in FIG. 3.

Two gyroscopic effects account for this phenomenon. The first is the characteristic whereby the ratio $\alpha$ max.: $\beta_1$ max. is always maintained equal to $$\sqrt{\frac{B}{H\omega \cos \lambda}}$$

In more simplified terms, this criterion may be stated as $$V_R = K\frac{\beta_1^2}{\alpha^2}$$

where $V_R$ = rotational speed of the gyro-rotor
$K$ = a constant compositing the moment of inertia of the gyro-rotor, the earth's rotational velocity and the latitude.

The second effect is that gyroscopic precession introduces a 90° phase lag. Thus when a change in rotor speed is produced while the locus is crossing the $\beta_1$ axis, its influence is seen only on the $\alpha$ axis.

Now when the locus of the north seeking element is at point 13 on the $\alpha$ axis, changes in speed cause a change in the $\alpha:\beta_1$ ratio. But since the effect of the change lags the application of the change by 90°, it is seen only as a difference in the maximum dip angle $\beta_1$. On the other hand, by allowing the locus to reach point 15 on the $\beta_1$ axis, before increasing rotor speed, the effect will be felt only on the $\alpha$ axis. And since an increase in rotor speed means that $$\frac{\beta_1^2}{\alpha^2}$$

must increase, it follows that $\alpha$ must decrease. It will be obvious that while an increase in rotor speed in the vicinity of the $\beta_1$ axis will effectively damp the $\alpha$ deviation, a decrease in rotor speed at the $\alpha$ axis will damp the inclination or dip angle $\beta_1$. Furthermore, it is apparent that any change in rotor speed at a point in the movement of the north seeking element which is removed from these two axes produces both an increased deviation along one of them and a decreased deviation along the other, since at any such point, this deviation is defined by components along both axes. Thus, in order to reduce azimuthal deviation at a rate greater than the rate at which inclinational deviation is correspondingly increased, it is necessary to effect the rotor velocity increases while the azimuthal deviation velocity components are greater than or predominate over the inclinational velocity components. Of course, the preferable region of rotor velocity increase is in the neighborhood of zero azimuthal deviation, or, since the oscillatory motion of the north seeking element is an ellipse, in the neighborhood of its maximum azimuthal velocity. It will also be noted that while this effect was described considering the case where no viscous damping was present, it would still take place and would even be enhanced by the presence of such damping.

FIG. 4, in which the scale of $\beta$ axis is substantially enlarged, shows an example of oscillation loci in the case where a two-steps-transference is carried out to raise the speed of rotation. The curve 21 depicts the oscillation locus of the north seeking sphere 4 in case of normal speed revolution, 22 depicts that in case of a lower speed, and 23 depicts that in case of an even lower speed than that corresponding to the second curve 22. In each case the same amplitude of azimuth angle is assumed. The oscillation initially started at lower speed may follow the real (or solid) portion of line 23, and at any point 24 is transferred to a higher revolution speed to follow a curve 25 similar to 22. At a still further point 26 the rotor speed is increased to normal so that the locus follows the curve 27. Thus a settling point may be approached earlier than by following locus 21 directly.

Now, the data obtained by the application of this principle on an actual gyrocompass will be explained in the following;

The data are disclosed in FIG. 5 through FIG. 10 by means of graphs which are plotted taking the azimuthal deviation reading in the abscissa axis versus time in the ordinate axis. These readings are obtained in such a manner that the gyrocompass is positioned so that the settling angle of the north seeking sphere 4 becomes 32.5°, while its reading at the starting instant is 70°. The gyro-rotor speed was gradually increased in various numbers of steps.

Figure 5:
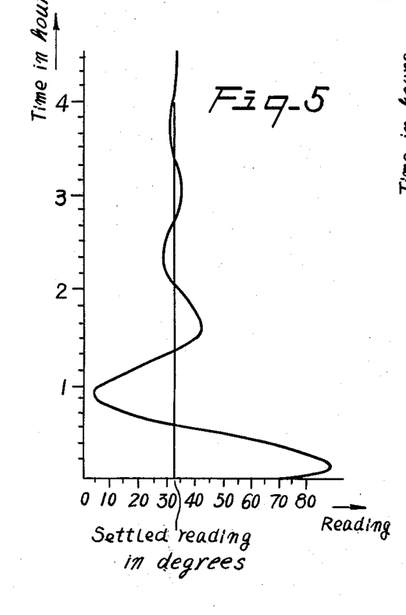
FIG. 5 is a graph showing a mode of oscillation from starting up to settling in the operation of the gyrocompass in the case where a conventional starting device is used.

FIG. 5 depicts a settling curve for the case of one-step-starting or of normal frequency start up to the full speed of 20,000 r.p.m. This settling curve, which indicates a typical response when operating according to conventional starting procedure, shows that 4.5 hours have elapsed to the point where a perfect settling is attained.

Figure 6:
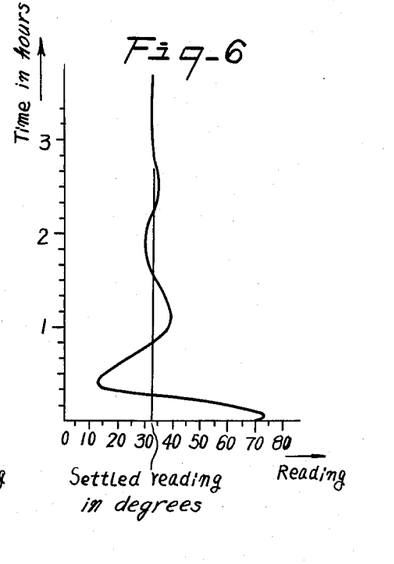
FIGS. 6 through 10 show the mode of oscillations in curves depicted through practical measurements, startings being carried out according to the method proposed by this invention.

FIG. 6 shows a response where the mean rotor speed is about 8,500 r.p.m., for the first 7.5 minutes of operation, is 11,000 r.p.m. for the next 10 minutes of operation and is raised to 11,000 r.p.m., and then raised to 20,000 r.p.m. thereafter. According to this schedule three hours have elapsed to reach perfect settling.

Figure 7:
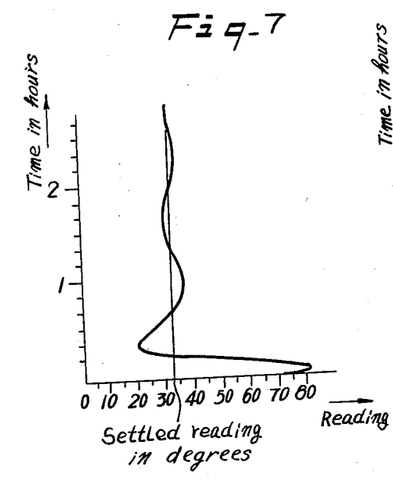

FIG. 7 shows a response where the mean rotor speed is about 5,000 r.p.m. for the first 5 minutes of operation, 7,000 r.p.m. speed for the next 9 minutes, and is raised to 20,000 r.p.m., thereafter. This curve shows that 2 hours 40 minutes have elapsed from initial start to attain final settling.

Figure 8:
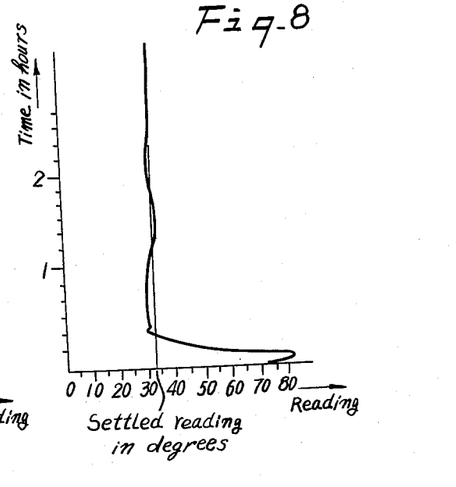

FIG. 8 shows a response where the mean rotor speed is about 5,000 r.p.m. for the first 5 minutes of operation, 8,000 r.p.m. for the next 5 minutes; 12,000 r.p.m. the following 5 minutes, then 14,000 r.p.m. for 5 minutes, and finally is raised to 20,000 r.p.m. This curve shows that 2 hours 30 minutes have elapsed from initial start to attain final settling.

Figure 9:
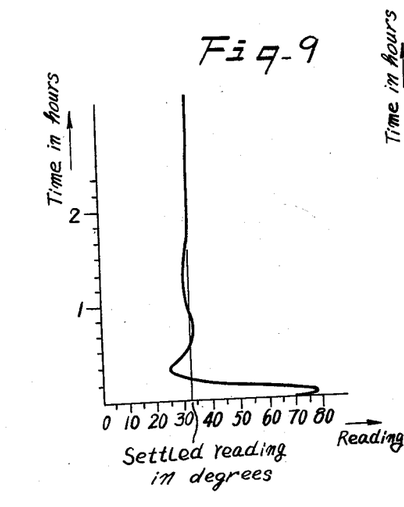

FIG. 9 shows a response in which the mean rotor speed is about 5,000 r.p.m. for the first 5 minutes of operation, 7,000 r.p.m. for the next 10 minutes, 9,500 r.p.m. for the next 5 minutes, 10,000 r.p.m. for the next 10 minutes, and finally to 20,000 r.p.m. This curve shows that 2 hours have elapsed to attain final settling.

Figure 10:
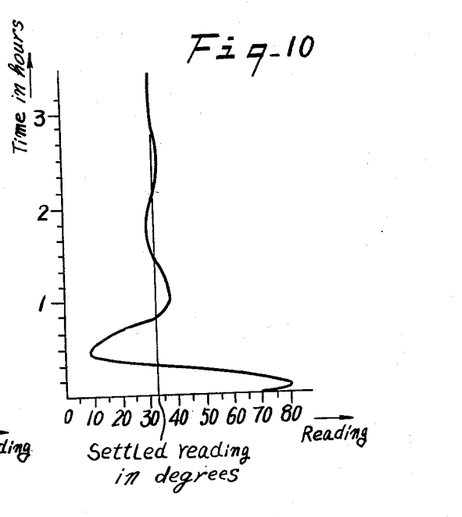

FIG. 10 shows a response in which the mean rotor speed is about 10,000 r.p.m. for 10 minutes after starting, 13,000 r.p.m. for the next 10 minutes, 15,000 r.p.m. for another 10 minutes, 17,000 r.p.m. for still another 10 minutes, and finally to 20,000 r.p.m. This curve shows that about 3 hours have elapsed from initial start to attain final settling.

Since in the case of FIG. 10 no lower speed is used as compared to that of FIGS. 8 and 9, a somewhat longer settling time is required.

Thus it has been shown that, if the revolution speed is raised in several successive steps and at proper intervals, a shorter settling time can be attained than could be achieved in one step. Also several attempts varying the number of steps gradually to increase the speed, and varying the number of revolutions and the duration of each step show that substantially shorter settling time can be obtained. In other words, conditions for changing the speed can be those technically commonly realizable without being limited to any particular one.

In most gyrocompass installations the gyro-rotor is rotated by means of an A.-C. induction motor which turns at a speed proportional to the frequency of the applied power. Thus the above described method of starting can be carried into practice simply by applying at the beginning of the starting period a lower frequency $f_L$ than the normal frequency $f_0$, and then in step by step fashion, increasing the applied frequency to raise the speed of rotation, so that at the final stage power at frequency $f_0$ is supplied to produce a normal operating speed.

Figure 11:
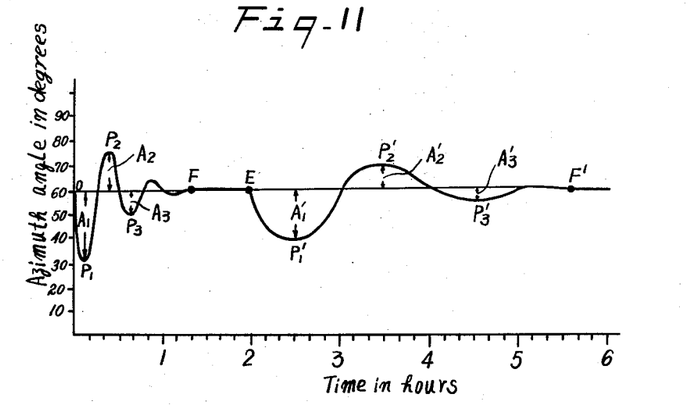
FIG. 11 shows an oscillation curve wherein the power source has been transferred to the normal frequency source so as to offset the oscillation which had been produced by the low-frequency start.

Referring now to FIG. 11, it will be observed that the direction and the magnitude of transient oscillations, which occur as a result of acceleration of the gyro-rotor, are in great part caused by the mechanical characteristics of the rotor itself. For instance, the transient oscillation which occurs in the case of a conventional starting method originates from the effects of slight mechanical unbalances in the gyro-rotor during its acceleration. Now if the point at which the change in applied frequency from $f_L$ to $f_0$ is chosen properly with respect to the point at which the original application of the initial starting frequency $f_L$ took place and is of proper amplitude with respect to the initial frequency change, the oscillations induced by the two transients can be made to cancel each other. Thus the basic techniques of the present invention can be refined to produce additional improvement.

Figure 12:
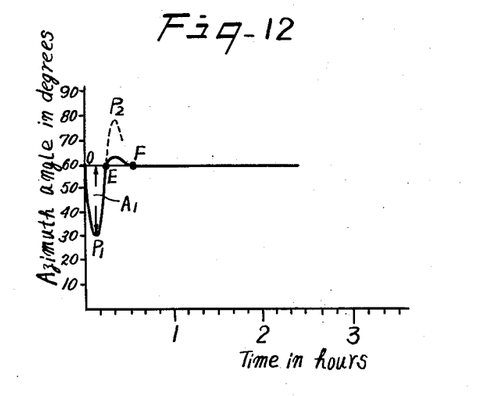

FIG. 12 is a graph showing the mode of an oscillation for the case in which the instant of frequency change is selected in the manner above stated. In the graph, 0 is the point of starting, $P_1$ the apex of the transient oscillation of the revolution started with the frequency $f_L$, E the point of time at which the frequency change was accomplished, and F, the point at which acceleration of the gyro-rotor up to the rotational speed corresponding to $f_0$ is completed. The gyro-sphere 4 is started at 0 with the frequency $f_L$. If a frequency change was not effected, the locus would advance through point E along the broken line part of the curve, shown in FIG. 12, towards another apex $P_2$, but because of a change in frequency from $f_L$ to frequency $f_0$ at point E, a transient oscillation due to the acceleration of the gyro-rotor up to the rotational speed corresponding to the frequency $f_0$ will be added in superposition. The direction of this transient oscillation due to $f_0$ is the same as that of $f_L$ at starting and is just opposite to the oscillation caused by application of $f_L$ so that both transient oscillations are added to offset each other, and, as shown in FIG. 12, the locus of the gyro-sphere advances from E along the real line and then the acceleration of the gyro-rotor ceases at F. Therefore, if the instant of this frequency change is selected suitably as at E, the point F where the acceleration ceases may easily be located in the normal settling direction, the oscillations becoming stable within a very short period.

Figure 16:
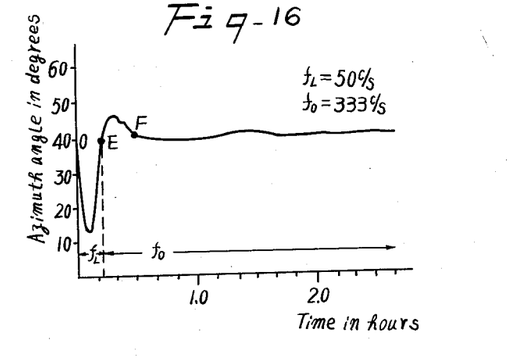
FIGS. 16 and 17 show oscillation curves depicted through practical observation, to which above stated control devices are applied by means of frequency transference.
Figure 17:
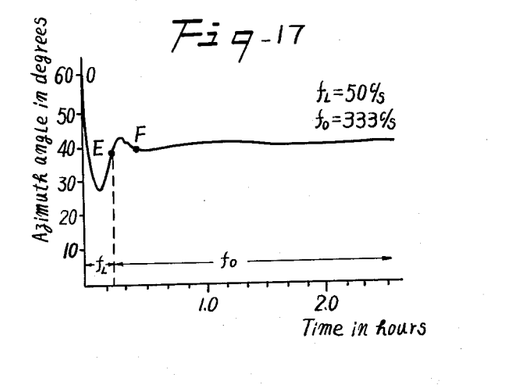

FIGS. 16 and 17 are the graphs showing the curves of oscillation from starting until settling as determined by observation of actual devices in cases where the above described starting method was carried out. It may be apparent that settling was attained within a short period for both devices and the gyro-compass provided utilizable indications as soon as the point F had been reached. In these examples, frequencies were taken as: $F_L = 50$ c./s., $F_0 = 333$ c./s.

The methods by which frequency change is controlled will now be described. One of the most simple means for this purpose is a timing relay or a timer which can perform a frequency change at an instant following a determined interval of time after starting the gyro-sphere. This technique assumes that the oscillation period of the gyro-sphere is exact. That is to say, the frequencies $f_L$ and $f_0$ are arranged to be supplied through a transferring switch S to a gyro-compass shown as K in FIG. 14. A timing device C is provided to control the selection of the instant, at which switch S is operated. Switching at a desired instant after starting can be accomplished by suitably setting the timing device with respect to the position of the gyro-sphere at the time of staring. The curves depicted in FIGS. 16 and 17 were both obtained by the time control system with frequency change.

Figure 14:
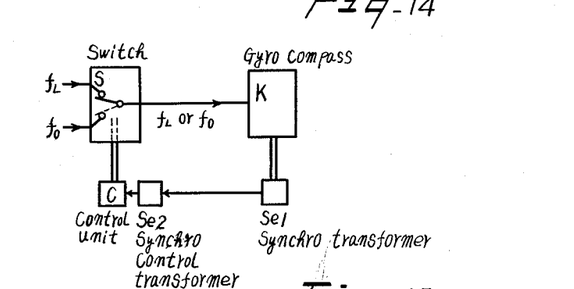

FIG. 14 shows an example of an arrangement for controlling the frequency change by means of synchro system, in which a transmitting synchro $Se_1$ mechanically coupled with the gyrocompass K transmits electrical signals representing the orientation or the deviation angle to a receiving synchro $Se_2$. If the rotating part of the receiving synchro $Se_2$ has been set at a position corresponding to the point E in FIG. 12, its output will be zero when the point E of the gyro-sphere is reached, so that it may be detected by the control part C to actuate the transferring switch S.

Figure 15:
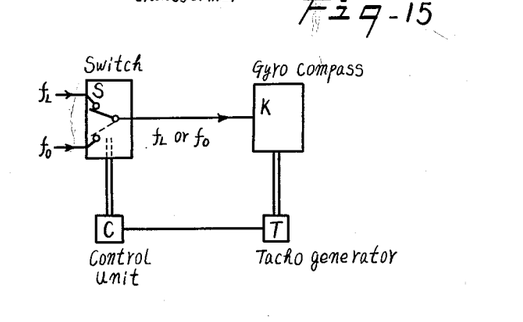

Further, in the example shown in FIG. 15, control is obtained by a tacho-generator T mechanically coupled with the gyrocompass K. As the output voltage of the tacho-generator T varies in proportion to the oscillation speed of the gyro-sphere, the control part C can detect the magnitude and phase of this output voltage to actuate the switch S.

It is important to remember in connection with the above-mentioned control devices that, as explained earlier, the gyro-rotor velocity increase must take place within a certain portion of the oscillatory movement of the north seeking element if proper damping is to be effected. Now when, as described in the above embodiments, accelerating torques are applied in steps at various instants to increase the rotational speed of the rotors, their inherent integrating properties tend to smooth out their response to these accelerating torques. As a result, it is conceivable that their net response might be a smooth and continuous velocity increase similar to that where a steady accelerating torque was applied. However, since, as explained previously, the present invention depends upon the gyro-rotors themselves attaining an increased rotational velocity within a certain portion of the movement of the north seeking element, the rotor driving means and associated components must be considered as being limited to those devices capable of producing the desired velocity increases within a given duration, substantially less than one-fourth the oscillatory period of the north seeking element, and of sustaining this increased velocity until a further increase is demanded.

The above described control devices are shown only by way of example and this invention is not limited to the means illustrated.

In the above are described methods to make the gyro-rotor to revolve in a low speed, in which at starting a source frequency lower than a normal frequency is used and at a suitable instant it is transferred to the source of normal frequency, but it will be noted that application of lower frequency a starting is in short merely a means to produce a lower speed revolution. Accordingly, even if the gyroscope be started with normal frequency, a lower speed revolution may be obtained by cutting off the source before it approaches the synchronous speed, so that the same purpose may be accomplished by again applying the source of normal frequency, catching an instant at which that oscillation can be offset, which device needs nothing but a source of normal frequency for the matter of course.

In the above description, the gyro-sphere is equipped with an oil vessel for damping the oscillation, but a gyro-sphere having a north seeking motion governed by the similar type of a differential equation as the Equation 1 may also be realized in that having the oscillation balance system in which the cause of oscillation is compensated by the displacement of mercury, in which, of course, above stated device of starting is applicable without any modification.

Having thus described the invention, what is claimed as new and desired to be secured by Letters Patent is:

1. In combination a gyrocompass, controllable driving means operative to produce higher speed gyro-rotor rotation within said gyrocompass while first control signals are supplied thereto and to produce lower speed gyro-rotor rotation while second control signals are supplied thereto, means for applying said first and second control signals to said driving means in alternate sequence and means for correlating the application of said control signals with the oscillatory movements of the north seeking element of said gyrocompass in such a manner that said first signals are introduced to said driving means only while the velocity of said north seeking element in the azimuthal direction predominates over its velocity in the inclinational direction and said second control signals are introduced to said driving means only while the velocity of said north seeking element in the inclinational direction predominates over its velocity in the azimuthal direction.

2. A starting device for a gyrocompass having gyro-rotor means disposed within a north seeking element which is subject to oscillatory movements, said starting device comprising driving means for producing rotation of said gyro-rotor means, said driving means being further capable upon each application thereto of a successive switching signal of increasing gyro-rotor speed only within a period substantially less than the oscillatory period of said north seeking element, and means for applying successive switching signals to said driving means as said north seeking element successively passes through the neighborhood of zero azimuthal deviation and for continuing said application of successive switching signals until said driving means produce normal operating gyro-rotor speed.

3. A starting device for a gyrocompass having gyro-rotor means disposed within a north seeking element which is subject to oscillatory movements, said starting device comprising a driving means which effects rotation of said gyro-rotor means, first and second power supply input means capable when connected of causing said driving means to effect within a period substantially less than the oscillatory period of said north seeking element sustained lower and higher rotational speeds respectively in said gyro-rotor means, switching means responsive to the application thereto of first and second switching signals to connect alternately and respectively said first and second power supply input means, means for initially applying said first switching signal to said switching means, and control means operative to apply said second switching signal to said switching means at a time following application of said first signal approximately equal to the time required by said north seeking element to achieve zero azimuthal deviation.

4. The apparatus described in claim 3 wherein said control means includes a timer set to produce said second switching signal after a period initiated by initial application of said first switching signal, said period being set in accordance with the oscillatory period of said north seeking element at said lower speed gyro-rotor rotation and the position of said element at the instant of application of said first switching signal.

5. In combination a gyrocompass having gyro-rotor means disposed within a north seeking element which is subject to oscillatory motion, said gyro-rotor means adapted to be driven by the induced effects of alternating electrical current, lower and higher frequency alternating current source inputs, capable when connected of effecting sustained synchronous rotation of said gyro-rotor means within a period substantially less than one-fourth of the oscilaltory period of said north seeking element, switching means capable of connecting said lower and higher frequency alternating current source inputs to said gyro-rotor means in alternate sequence in response to the application to said switching means of first and second switching signals respectively, and means for initially applying a first switching signal to said switching means and for subsequently applying said second switching signal to said switching means when the north seeking element of said gyrocompass is in the neighborhood of maximum inclinational deviation.

6. In combination a gyrocompass having gyro-rotor means disposed within a north seeking element which is subject to oscillatory movements, said gyro-rotor means being adapted to be driven by the induced effects of alternating electrical current, switching means capable of maintaining connection of lower and higher frequency alternating current sources in alternate sequence to said rotors in response to the application to said switching means of first and second switching signals, respectively, a synchro transmitter connected to produce remote signals representative of the oscillatory movements of said north seeking element, a synchro receiver connected to receive said remote signals, said synchro receiver being adapted to produce voltage outputs representative of the various deviational components represented by said remote signals, and a control apparatus operable initially to apply first switching signals to said switching means and then subsequently in response to the voltages from said synchro receiver indicating an azimuthal deviation component of said north seeking element being in the neighborhood of zero, to apply said second switching signal to said switching means.

7. In combination a gyrocompass having gyro-rotor means disposed within a north seeking element which is subject to oscillatory movements, said gyro-rotor means being adapted to be driven by the induced effects of alternating electrical current, switching means capable of maintaining connection of lower and higher frequency alternating current sources in alternate sequence to said rotors in response to the application to said switching means of first and second switching signals, respectively, a tacho-generator connected to produce voltage outputs representative of the various velocity components of the oscillatory motion of said north seeking element, and a control apparatus operable initially to apply first switching signals to said switching means and then subsequently in response to the voltages from said tacho-generator indicating the azimuthal velocity components of said north seeking element being in the neighborhood of their maximum value, to apply said second switching signal to said switching means.

8. A method for starting a gyrocompass having gyro-rotor means disposed within a north seeking element which is subject to oscillatory motion, said method comprising, producing gyro-rotor rotation at an initial speed lower than normal operating speed, maintaining said initial speed while the inclinational velocity of said north seeking element predominates over its azimuthal velocity and increasing gyro-rotor speed substantially within the duration of one-fourth of the oscillatory period of said north seeking element, while its azimuthal velocity predominates over its inclinational velocity.

9. The method described in claim 8 wherein the increasing of rotor speed is done in several similar steps at mutually opposite points in the course of movement of said north seeking element, and continuing said similar steps until normal operating gyro-rotor speed is attained.

References Cited in the file of this patent
UNITED STATES PATENTS 1,886,606    Thompson et al. ---------- Nov. 8, 1932

UNITED STATES PATENT OFFICE
Certificate of Correction

Patent No. 3,077,672                                                        February 19, 1963

Junichi Sasaki et al.

It is hereby certified that error appears in the above numbered patent requiring correction and that the said Letters Patent should read as corrected below.

Column 1, line 12, beginning with "This invention relates to" strike out all to and including "Letters Patent is:" in line 26, column 9, and insert instead the following:

This invention relates to a gyrocompass damping system, particularly to such a system whereby the time from starting a gyrocompass up to settling of reading on the meridian, or the settling time, can considerably be decreased.

For the purpose of damping oscillations about the meridian, to which the north seeking element of a gyrocompass is subjected, there is generally provided either a so-called "Anschutz" type damping device, in which a viscous liquid is displaced within a suitable vessel to damp the oscillation, or a so-called "Sperry" type damping device, in which a component of the movement of the north seeking element produces a displacement of a mass of mercury within a particularly built vessel which in turn offsets the cause of the said oscillation. Whatever form the gyrocompass and its damping device may take, however, all previously known methods of initiating operation require a period from starting up to settling of reading which may be as long as several hours.

One conventional starting method, for example, is that wherein the gyro-rotor means within the north seeking element of the gyrocompass is set into rotation by means of an induction type electrical motor. These motors and the gyro-rotors they drive turn at a speed directly proportional to the frequency of an applied alternating current. This frequency is applied at the beginning of the starting period thus immediately causing the rotor to turn at normal operating speed from the first instant of start.

One feature of this invention resides in that at the beginning of the starting period of the gyrocompass, the gyro-rotor is made to rotate at a speed lower than normal. Then its speed is increased gradually to attain normal operation.

Another feature is that at the beginning of the starting period the gyro-rotor is set in rotation at an initial speed corresponding to first applied A.-C. frequency which is lower than the normal frequency. The induction motor driving the rotor is then transferred to a source of normal operating frequency at a prescribed instant. This subsequent change produces a further transient oscillation that will offset the initial oscillation caused by the application of the low frequency power.

Further features will be well clarified in the detailed explanation given in the following by aid of several illustrative examples embodying the principle of this invention.

Figure 13:
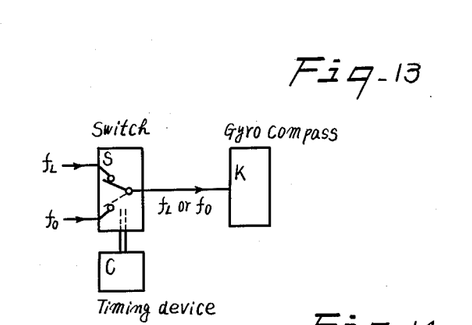
FIGS. 13, 14 and 15 are block diagrams indicating various apparatus for carrying out the method of the present invention.

In the drawings, FIG. 1 is a cross-sectional view of an Anschutz-type dual-rotor gyrocompass with a viscous type oscillation damping device, FIGS. 2, 3 and 4 are the graphs showing the north seeking motion of the gyrocompass, which may aid in understanding the principle of this invention, FIG. 5 is a graph showing a mode of oscillation from starting up to settling in the operation of the gyrocompass in the case where a conventional starting device is used, FIGS. 6 through 10 show the modes of oscillation in curves depicted through practical measurements, startings being carried out according to the method proposed by this invention, FIG. 11 shows an oscillation curve wherein the power connection has been transferred to the normal frequency source so as to offset the oscillation which had been produced by the low-frequency start, FIGS. 13, 14 and 15 are block diagrams indicating various apparatus for carrying out the method of the present invention, and FIGS. 16 and 17 show oscillation curves depicting the movements of actual devices operating according to the present invention.

In FIG. 1 is shown a gyrocompass equipped with a damping device utilizing the displacement of a viscous liquid, wherein floated in the liquid 2, which is contained in an outer sphere 1, is a north seeking inner sphere or sensitive element 4, which is provided with azimuth scale 3 on the external surface thereof within which are disposed dual gyro-rotors 5 having horizontal axes. A damping mechanism 6 is mounted directly above the gyro-rotors 5 within the north seeking inner sphere 2. The damping mechanism comprises an annular cylindrical vessel containing a viscous liquid therein.

Utilizing an illustrative example of a gyrocompass having an oscillation damping device as shown in FIG. 1, the behavior thereof from its starting to its settling at a north pointing position may, as priorly known, be expressed by the following Equation 1:

$$H\frac{d^3\alpha}{dt^3}+HF\frac{d^2\alpha}{dt^2}+B\omega \cos \lambda \frac{d\alpha}{dt}+(B-C)F\omega \cos \lambda.\alpha=0 \quad (1)$$

wherein, $H$: product of rotational speed and moment of inertia of the gyro-rotor,
$F$: fluidity constant of the viscous oil,
$B$: restoring torque constant of the inner sphere with respect to the horizontal position,
$\omega$: angular velocity of the earth rotation,
$\lambda$: the latitude,
$C$: anti-restoring torque constant due to the gravitational mass of the viscous oil,
$\alpha$: deviation angle of the inner sphere,
$t$: time elapsed from the instant of start.

As generally known, this equation can be resolved from the following three basic equations:

$$H\left(\frac{d\alpha}{dt}+\omega \sin \lambda\right)=B\beta+C\gamma \quad (2)$$

$$H\left(\frac{d\beta}{dt}+\omega \cos \lambda.\alpha\right)=0 \quad (3)$$

$$\frac{d\gamma}{dt}+F(\beta+\gamma)=0 \quad (4)$$

wherein, $\beta$: inclination or "dip" angle of the inner sphere with respect to the horizon, taken about a generally east-west axis,
$\gamma$: angular difference between the oil level at the north seeking part and the south seeking part of the cylindrical annular vessel 6.

Equation 2 shows that the precession speed of the gyro-rotors due to the restoring torque $B\beta$, when the inclination angle of the inner sphere is $\beta$, and the torque produced by the damping oil, $C\gamma$, is $$\frac{d\alpha}{dt}+\omega \sin \lambda$$

Equation 3 shows that the north seeking part appears to have an inclination speed, $$\frac{d\beta}{dt}$$

by virtue of the component of the earth rotation when the deviation angle of the north seeking axis of the gyrocompass is $\alpha$; and Equation 4 shows that, when the inclination angle of the inner sphere is $\beta$ and the angular difference between the oil levels within the inner oil vessel is $\gamma$, the speed of oil flow in one direction, namely, the derivative of the oil level, $$\frac{d\gamma}{dt}$$

is proportional to the resultant difference of oil levels.

Given the north point deviation, $\alpha_0$, with respect to the meridian, at the instant of starting the north seeking motion of the north seeking element 4, and the gyro-rotors having been set in rotation, the following Equation 5 may be obtained from the Equation 1:

$$H\frac{d^3\alpha}{dt^3}+HF\frac{d^2\alpha}{dt^2}+B\omega \cos \lambda \frac{d\alpha}{dt}=(B-C)F\omega \cos \lambda.\alpha_0 \quad (5)$$

In the early stage of this start, the rate of change of acceleration of the deviation angle, $$\frac{d^3\alpha}{dt^3}$$

has a substantial finite value, but the acceleration alone of the angle, $$\frac{d^2\alpha}{dt^2}$$

and its velocity, $$\frac{d\alpha}{dt}$$

must gradually increase from zero as the time elapses. Thus the acceleration, $$\frac{d^2\alpha}{dt^2}$$

and velocity, $$\frac{d\alpha}{dt}$$

of the deviation angle $\alpha$, may initially be neglected as compared to its rate of change of acceleration, $$\frac{d^3\alpha}{dt^3}$$

Accordingly, the above Equation 5 may be expressed as follows:

$$H\frac{d^3\alpha}{dt^3} = -(B-C)F\omega \cos \lambda . \alpha_0 \qquad (6)$$

After a certain time, the velocity of the deviation angle, $$\frac{d\alpha}{dt}$$

alone can be neglected as compared to its rate of change of acceleration, $$\frac{d^3\alpha}{dt^3}$$

and its acceleration, $$\frac{d^2\alpha}{dt^2}$$

so that the Equation 5 may be expressed in the following manner;

$$H\frac{d^3\alpha}{dt^3} + HF\frac{d^2\alpha}{dt^2} = -(B-C)F\omega \cos \lambda . \alpha_0 \qquad (7)$$

As the terms at the left side of the Equations 6 and 7 are the products of H and $$\frac{d^3\alpha}{dt^3}$$

or of H and F $$\frac{d^2\alpha}{dt^2}$$

and since the right sides of these equations are lacking in H and $\alpha$ terms, it may be seen that by decreasing H, the $\alpha$ terms, namely $$\frac{d^3\alpha}{dt^3}$$

and $$\frac{d^2\alpha}{dt^2}$$

become greater so that the damping of the deviation angle, $\alpha$, is hastened. That is to say, if H is decreased, as by lowering the speed of rotation of the gyro-rotors, the time necessary to attain settling of the north seeking sphere 4 on the meridian is made shorter.

The manner in which this principle is incorporated into the present invention will now be described.

For the sake of simplicity in explanation, a case will first be considered in which the viscous damping oil has no flowing motion in the annular vessel 6, i.e., $F=0$. For this case an undamped oscillation will take place. That is, the path of a point on the north seeking sphere 4 will be an ellipse centered in azimuth by the north meridians ($\alpha=0$) and in inclination by the dip angle $$\beta = \frac{H\omega \sin \lambda}{B}$$

From the Equations 2 and 3 the relation between the maximum of the azimuth angle, $\alpha$, and of the dip angle, $\beta$, is found to produce the following ratio:

$$\frac{\alpha_{max.}}{\beta_{max.} - \frac{H\omega \sin \lambda}{B}} = \sqrt{\frac{B}{H\omega \sin \lambda}}$$

Now, for the purpose of simplifying the equations, the origin of the $\beta$ axis may hereinafter be shifted to $$\beta = \frac{H\omega \sin \lambda}{B}$$

Then if $\beta_1$ shows the magnitude according to the new co-ordinate, we shall have, $$\beta_1 = \beta - \frac{H\omega \sin \lambda}{B}$$

thus the ratio of the major axis and the minor axis of the ellipse will be, $$\frac{\alpha_{max.}}{\beta_{1\,max.}} = \sqrt{\frac{B}{H\omega \cos \lambda}}$$

Replacing each constant with a typical numerical value, the ratio, $\alpha_{max.}:\beta_{1\,max.}$, comes to be about 20:1.

It can be seen in this regard that H is smaller when the rotating speed of the gyro-rotor is lower so that the dip angle, $\beta_{1\,max.}$, becomes even smaller with respect to the azimuth angle, $\alpha_{max.}$.

FIGS. 2, 3 and 4 show oscillatory paths of the north seeking element with $\alpha$ as abscissa and representing the up-down or inclinational movements; and $\beta_1$ as ordinates, representing the east-west or azimuthal movements. In the graph, the scale of the ordinate axis has been enlarged for the convenience of explanation.

In FIGS. 2 and 3, the line 11 indicates the path of a point on the north seeking sphere 4 when the gyro-rotors 5 are operating at normal speed. Similarly, the line 12 indicates the path undergone when the gyro-rotor speed is one-fourth of normal, the same initial condition of azimuth angle being assumed. (Theoretically speaking, the center of the elliptical locus also changes since, as seen above, $\beta_{1\,max.}$ varies with changes in H, which in turn varies with rotor speed. However the actual amount of this change is negligibly small with respect to the damping effects to be described and need not be further considered.)

In following the oscillatory movements of the north seeking element it can be seen that the azimuth angle $\alpha_{max.}$ and the dip angle $\beta_{1\,max.}$ are mutually interrelated so that either may be decreased to effect a shortening of the settling time when the decrease is brought about at a proper instant. The period of undamped oscillation is expressed by $$2\pi\sqrt{\frac{H}{B\omega \cos \lambda}}$$

Therefore, the more H is reduced (as by decreasing the rotational velocity of the gyro-rotor), the shorter becomes the period of oscillation and the smaller becomes the dip angle $\beta_{1\,max.}$. Considering now the gyro-rotor to be started when the center of the north seeking sphere has an easterly deviation such as indicated by point 13 in FIG. 3, it will be seen that if the rotational velocity is initially made low, the path of the north seeking element 4 will coincide with the inner curve 12; while if it is initially made high (as at normal operating speed), the path will coincide with the outer curve 11. In any event, the ratio between the maximum deviation and the maximum inclination $\alpha_{max}:\beta_{1\,max.}$ is always given by $$\sqrt{\frac{B}{H\omega \cos \lambda}}$$

It will be observed that the timing of the instant at which the rotor speed changes are made is especially important in obtaining optimum results. Considering, for example, the effect upon the north seeking element when, while at point 13 in FIG. 2 its rotor speed is shifted upwardly. When this happens, the rotor merely follows the outer curve 11 rather than the inner curve 12; and, if anything, a disadvantage results, for the maximum dip angle $\beta_{1\,max.}$ will be increased. On the other hand, if the initial low rotor speed is maintained until the point on the north seeking element travels along the inner curve 12 to a position somewhere in the vicinity of the point 15; and then the rotor speed is increased, the element will take a sharp dip and follow a path shown by the solid line 17 in FIG. 3.

Two gyroscopic effects account for this phenomenon. The first is the characteristic whereby the ratio $\alpha_{max}:\beta_{1\,max.}$ is always maintained equal to $$\sqrt{\frac{B}{H\omega \cos \lambda}}$$

In more simplified terms, this criterion may be stated as $$V_R = K \frac{\beta_1^2{}_{max.}}{\alpha^2{}_{max.}}$$

where $V_R$ = rotational speed of the gyro-rotor
$K$ = a constant compositing the moment of inertia of the gyro-rotor, the restoring torque constant of the inner sphere with respect to the horizontal position, the earth's rotational velocity and the latitude.

The second effect is that gyroscopic precession introduces a 90° phase lag. Thus when a change in rotor speed is produced while the locus is crossing the $\beta_1$ axis, its influence is seen only on the $\alpha$ axis.

Now when the locus of the north seeking element is at point 13 on the $\alpha$ axis, changes in speed cause a change in the $\alpha_{max.}:\beta_{1\,max.}$ ratio. But since the effect of the change lags the application of the change by 90°, it is seen only as a difference in the maximum dip angle $\beta_{1\,max.}$. On the other hand, by allowing the locus to reach point 15 on the $\beta_1$ axis, before increasing rotor speed, the effect will be felt only on the $\alpha$ axis. And since an increase in rotor speed means that $$\frac{\beta_{1\,max.}^2}{\alpha_{max.}^2}$$

must increase, it follows that $\alpha_{max.}$ must decrease. It will be obvious that while an increase in rotor speed in the vicinity of the $\beta_1$ axis will effectively damp the $\alpha$ deviation, a decrease in rotor speed at the $\alpha$ axis will damp the inclination or dip angle $\beta_1$. Furthermore, it is apparent that any change in rotor speed at a point in the movement of the north seeking element which is removed from these two axes produces both an increased deviation along one of them and a decreased deviation along the other, since at any such point, this deviation is defined by components along both axes. Thus, in order to reduce azimuthal deviation at a rate greater than the rate at which inclinational deviation is correspondingly increased, it is necessary to effect the rotor velocity increases while the azimuthal deviation velocity components are greater than or predominate over the inclinational velocity components. Of course, the preferable region of rotor velocity increase is in the neighborhood of zero azimuthal deviation, or, since the oscillatory motion of the north seeking element is an ellipse, in the neighborhood of its maximum azimuthal velocity. It will also be noted that while this effect was described considering the case where no viscous damping was present, it would still take place and would even be enhanced by the presence of such damping.

FIG. 4, in which the scale of $\beta$ axis is substantially enlarged, shows an example of oscillation paths for the case where the rotational speed of the gyro-rotors is increased in two successive steps. The curve 21 depicts the oscillatory movements of the north seeking sphere 4 in case of normal gyro-rotor speed, 22 depicts these movements for the case of a lower rotational speed, and 23 depicts the same movements for the case of an even lower rotational speed.

In each case the same amplitude of azimuth angle is assumed. The oscillation initially started at lower gyro-rotor speed may follow the real (or solid) portion of line 23, and at any point 24 the rotor speed is increased whereby the north seeking element is caused to follow a curve 25 similar to curve 22. At a still further point 26 the rotor speed is increased to normal so that the north seeking element follows the curve 27. Thus a settling point may be approached earlier than by following the path 21 directly.

The data obtained by the application of this principle on an actual gyrocompass will be explained in the following:

The data are displayed in FIG. 5 through FIG. 10 by means of graphs, which are plotted taking the azimuthal deviation reading along the abscissa axis and time along the ordinate axis. The readings were obtained for the situation where the gyrocompass is positioned at 32.5° from true north and where at the instant of start, it gave a reading of 70° from true north. The gyro-rotor speed was gradually increased in various numbers of steps.

FIG. 5 depicts a settling curve for the case of one-step starting or of normal frequency start up to the full speed of 20,000 r.p.m. This settling curve, which indicates a typical response when operating according to conventional starting procedure, shows that 4.5 hours have elapsed to the point where a perfect settling is attained.

FIG. 6 shows a response where the mean rotor speed is about 8,500 r.p.m., for the first 7.5 minutes of operation, is 11,000 r.p.m. for the next 10 minutes of operation and is raised to 20,000 r.p.m. thereafter. According to this schedule three hours have elapsed to reach perfect settling.

FIG. 7 shows a response where the mean rotor speed is about 5,000 r.p.m. for the first 5 minutes of operation, 7,000 r.p.m. for the next 9 minutes, and is raised to 20,000 r.p.m. thereafter. This curve shows that 2 hours 40 minutes have elapsed from initial start to attain final settling.

FIG. 8 shows a response where the mean rotor speed is about 5,000 r.p.m. for the first 5 minutes of operation, 8,000 r.p.m. for the next 5 minutes, 12,000 r.p.m. the following 5 minutes, then 14,000 r.p.m. for 5 minutes, and finally is raised to 20,000 r.p.m. This curve shows that 2 hours 30 minutes have elapsed from initial start to attain final settling.

FIG. 9 shows a response in which the mean rotor speed is about 5,000 r.p.m. for the first 5 minutes of operation, 7,000 r.p.m. for the next 10 minutes, 9,500 r.p.m. for the next 5 minutes, 10,000 r.p.m. for the next 10 minutes, and finally to 20,000 r.p.m. This curve shows that 2 hours have elapsed to attain final settling.

FIG. 10 shows a response in which the mean rotor speed is about 10,000 r.p.m. for 10 minutes after starting, 13,000 r.p.m. for the next 10 minutes, 15,000 r.p.m. for another 10 minutes, 17,000 r.p.m. for still another 10 minutes, and finally to 20,000 r.p.m. This curve shows that about 3 hours have elapsed from initial start to attain final settling.

Since in the case of FIG. 10 no speed is used comparable with the lower ones in the case of FIGS. 8 and 9, a somewhat longer settling time is required.

Thus it has been shown that, if the gyro-rotor speed is raised in several successive steps and at proper times, a shorter settling time can be attained than could be achieved in one step. It has also been found from experimentation that by varying the number of steps in which gyro-rotors are brought up to normal operating speed and by varying the duration between the steps, the settling time can be considerably reduced. The actual means for producing this stepped speed increase may be realized by combining elements presently within the knowledge of those skilled in the art to which the subject matter of this invention relates.

In most gyrocompass installations the gyro-rotor is rotated by means of an A.-C. induction motor which turns at a speed proportional to the frequency of the applied power. Thus the above described method of starting can be carried into practice simply by applying at the beginning of the starting period a lower frequency ($f_L$) than the normal operating frequency ($f_O$), and then in step by step fashion, increasing the applied frequency to raise the speed of rotation, so that at the final stage power at frequency $f_O$ is supplied to produce a normal operating speed.

Referring now to FIG. 11, it will be observed that the direction and the magnitude of transient oscillations, which occur as a result of acceleration of the gyro-rotor, are in great part caused by the mechanical characteristics of the rotor itself. For instance, the transient oscillation which occurs in the case of a conventional starting method originates from the effects of slight mechanical unbalances in the gyro-rotor during its acceleration. Now if the point at which the change in applied frequency from $f_L$ to $f_O$ is chosen properly with respect to the point at which the original application of the initial starting frequency $f_L$ took place and is of proper amplitude with respect to the initial frequency change, the oscillations induced by the two transients can be made to cancel each other. Thus the basic techniques of the present invention can be refined to produce additional improvement.

FIG. 12 is a graph showing the oscillation which results when the timing of the applied frequency changes is selected in the above described manner. In the graph, 0 corresponds to the instant of starting, $P_1$, the apex of the transient oscillation produced by the application of the initial frequency $f_L$, E, the point of time at which the applied frequency is increased, and F, the point at which the gyro-rotor attains normal operating speed corresponding to $f_O$. The gyro-sphere 4 is started at 0 with the frequency $f_L$. If a frequency change were not effected, the north seeking portion of the gyro-sphere would advance through point E along the broken line part of the curve, shown in FIG. 12, towards another apex $P_2$, but because of a change in frequency from $f_L$ to frequency $f_O$ at point E, a transient oscillation due to the acceleration of the gyro-rotor up to the rotational speed corresponding to the frequency $f_O$ will be added in superposition. The direction of this transient oscillation due to $f_O$ is the same as that of $f_L$ at starting and is just opposite to the oscillation caused by application of $f_L$, so that both transient oscillations are added to offset each other, and, as shown in FIG. 12, the north seeking portion of the gyro-sphere advances from E along the real line and then the acceleration of the gyro-rotor ceases at F. Therefore, if the instant of this frequency change is selected suitably, as at E, the point F where the acceleration ceases may easily be caused to be located in the normal settling direction, the oscillations becoming stable within a very short period.

FIGS. 16 and 17 are graphs showing the curves of oscillation from starting until settling as determined by observation of actual devices in cases where the above described starting method was carried out. It may be apparent that settling was attained within a short period for both devices and the gyrocompass provided utilizable indications as soon as the point F had been reached. In these examples, frequencies were taken as: $F_L = 50$ c./s., $F_O = 333$ c./s.

Various means for controlling rotor speed according to the teachings of the present invention will now be described. One of the most simple means for this purpose is a timing relay or a timer which can perform a frequency change at an instant following a determined interval of time after starting the gyro-sphere. This technique assumes that the oscillation period of the gyro-sphere is exact. That is to say, the frequencies $f_L$ and $f_O$ are arranged to be supplied through a transferring switch S to a gyrocompass shown as K in FIG. 14. A timing device C is provided to control the selection of the instant at which switch S is operated. Switching at a desired instant after starting can be accomplished by suitably setting the timing device with respect to the position of the gyro-sphere at the time of starting. The curves depicted in FIGS. 16 and 17 were both obtained by the time control system with frequency change.

FIG. 14 shows an example of an arrangement for controlling the frequency change by means of a synchro system, in which a transmitting synchro $Se_1$ mechanically coupled with the gyrocompass K transmits electrical signals representing the orientation or the deviation angle to a receiving synchro $Se_2$. If the rotating part of the receiving synchro has been set at a position corresponding to the point E in FIG. 12, its output will be zero when the point E of the gyro-sphere is reached, so that it may be detected by the control part C to actuate the transferring switch S.

Further, in the example shown in FIG. 15, control is obtained by a tacho-generator T mechanically coupled with the gyrocompass K. As the output voltage of the tacho-generator T varies in proportion to the oscillation speed of the gyro-sphere, the control part C can detect the magnitude and phase of this output voltage to actuate the switch S.

It is important to remember in connection with the above-mentioned control devices that, as explained earlier, the gyro-rotor velocity increase must take place within a certain portion of the oscillatory movement of the north seeking element if proper damping is to be effected. Now when, as described in the above embodiments, accelerating torques are applied in steps at various instants to increase the rotational speed of the rotors, their inherent integrating properties tend to smooth out their response to these accelerating torques. As a result, it is conceivable that their net response might be a smooth and continuous velocity increase similar to that where a steady accelerating torque was applied. However, since, as explained previously, the present invention depends upon the gyro-rotors themselves attaining an increased rotational velocity within a certain portion of the movement of the north seeking element, the rotor driving means and associated components must be considered as being limited to those devices capable of producing the desired velocity increases within a given duration, substantially less than one-fourth the oscillatory period of the north seeking element, and of sustaining this increased velocity until a further increase is demanded.

The above described control devices are shown only by way of example and this invention is not limited to the means illustrated.

In the above are described means for causing the gyro-rotors to revolve at a low initial speed by applying a frequency lower than a normal frequency and then at a suitable instant, causing the gyro-rotors to revolve at higher speed by applying the normal frequency. It will be noted that the application of a lower frequency at starting is solely for the purpose of producing an initial lower speed rotation. Accordingly, even if the gyroscope be started by initial application of the normal frequency, the required lower speed rotation may be obtained simply by cutting off the source before the gyro-rotors reach their synchronous speed. Thus the method of the invention may be practiced by applying the source of normal operating frequency at proper instants so that the resulting transient oscillations can be offset.

In the above description, the gyro-sphere is equipped with an oil vessel for damping the oscillation, but a gyro-sphere having a north seeking motion governed by a differential equation similar to Equation 1 may also be realized while using an oscillation balance system in which the cause of oscillation is compensated by the displacement of mercury, in which, of course, above stated device of starting is applicable without any modification.

Having thus described the invention, what is claimed as new and desired to be secured by Letters Patent is:

Signed and sealed this 3rd day of December 1963.

[SEAL]

Attest:
ERNEST W. SWIDER,
*Attesting Officer.*

EDWIN L. REYNOLDS,
*Acting Commissioner of Patents.*